United States Patent
Ajanovic et al.

[19]

[11] Patent Number: 5,859,988
[45] Date of Patent: Jan. 12, 1999

[54] TRIPLE-PORT BUS BRIDGE

[75] Inventors: Jasmin Ajanovic, Folsom; Patrick N. Kearns, Cameron Park, both of Calif.

[73] Assignee: Intel Corporation, Santa Clara, Calif.

[21] Appl. No.: 536,275

[22] Filed: Sep. 29, 1995

[51] Int. Cl.$^6$ .................................................. G06F 13/00
[52] U.S. Cl. ......................... 395/309; 395/306; 395/308; 395/280
[58] Field of Search .................... 395/309, 280, 395/300, 292, 308, 287, 473, 293, 325, 306; 370/85.1; 264/708.1; 390/403

[56] References Cited

U.S. PATENT DOCUMENTS

| | | | |
|---|---|---|---|
| 5,535,340 | 7/1996 | Bell et al. ................................. | 395/292 |
| 5,555,383 | 9/1996 | Elazar et al. ............................. | 395/306 |
| 5,568,621 | 10/1996 | Wooten .................................... | 395/292 |
| 5,572,688 | 11/1996 | Sytwu ...................................... | 395/309 |
| 5,594,882 | 1/1997 | Bell et al. ............................ | 395/421.02 |
| 5,602,851 | 2/1997 | Terashita et al. ........................ | 370/403 |
| 5,621,900 | 4/1997 | Lane et al. ............................... | 395/300 |
| 5,630,094 | 5/1997 | Hayek et al. ............................. | 395/473 |
| 5,664,117 | 9/1997 | Shah et al. ............................... | 395/280 |
| 5,751,975 | 5/1998 | Gillespie et al. ........................ | 395/306 |
| 5,793,996 | 8/1998 | Childers et al. ......................... | 395/309 |

*Primary Examiner*—Meng-Ai T. An
*Assistant Examiner*—Eric S. Thlang
*Attorney, Agent, or Firm*—Blakely, Sokoloff, Taylor & Zafman LLP

[57] ABSTRACT

A bridge coupling a primary bus to two secondary buses. The bridge contains three interfaces, one for the primary bus and the other two for the two secondary buses. Control circuitry is included within the bridge to support the execution of a transaction initiated by a bus master upstream of the bridge to a target downstream of the bridge. The bridge also supports the execution of a transaction initiated by a bus master coupled to either one of the secondary buses to a target upstream of the bridge.

10 Claims, 4 Drawing Sheets

TRIPLE-PORT BUS BRIDGE

FIELD OF THE INVENTION

The present invention relates to computer system bus architectures and more particularly to a method for coupling a primary bus to two secondary buses.

BACKGROUND OF THE INVENTION

In a computer system, a bus may be thought of as the communication interlink between various components of the computer system. Different computer systems may use different types of bus architectures. One type of bus architecture is the Industry Standard Architecture (ISA) bus. Another is the Extended ISA (EISA) bus. A more recent bus architecture is the Peripheral Component Interconnect (PCI) Local Bus architecture. As described by the *PCI Local Bus Specification*, Revision 2.1 (1995), the PCI Local Bus is a high performance bus that is intended as an interconnect mechanism between highly integrated peripheral controller components, peripheral add-in boards, and processor/memory subsystems.

A bridge is a device or set of devices that couples one computer bus to another and allows them to communicate with each other. Generally, bridges are asymmetrical in that one bus to which a bridge is coupled will have priority over the other bus to which the bridge is also coupled. The bus with the higher priority is the one closest to the main processor of the computer system and is called the primary bus. The other bus coupled to the bridge having lower priority is called the secondary bus. Similarly, the interface of the bridge which is coupled to the primary bus is called the primary interface, while the bridge interface coupled to the secondary bus is called the secondary interface. Transactions that are forwarded from the primary interface to the secondary interface of a bridge are said to be flowing downstream while transactions forwarded from the secondary interface to the primary interface of the bridge are said to be flowing upstream.

A block diagram of a computer system is shown in FIG. 1. Host bridge 102 serves to couple processor 101 to PCI bus 104. In addition, host bridge 102 controls accesses to the main memory subsystem 103 of the computer system. There are three bus agents coupled to PCI bus 104 along with a PCI to PCI bridge 105. Bridge 105 is also coupled to PCI bus 106. There are three bus agents coupled to PCI bus 106 along with PCI to PCI bridge 107. Bridge 107 is additionally coupled to PCI bus 108. There are four bus agents coupled to PCI bus 108.

PCI buses exhibit electrical loading limitations which restrict the number of devices which can be coupled to a PCI bus. For example, the ten bus agents shown in the computer system of FIG. 1 could not all be coupled to PCI bus 104, because ten bus agents on PCI bus 104 would overload that bus. However, by creating the hierarchical structure of the computer system shown in FIG. 1 using PCI to PCI bridges 105 and 107, a system designer is afforded the ability to overcome electrical loading limits imposed by PCI buses.

Note that with respect to bridge 105, PCI bus 104 is the primary bus while PCI bus 106 is the secondary bus. Similarly, with respect to bridge 107, PCI bus 106 is the primary bus while PCI bus 108 is the secondary bus. The primary and secondary interfaces of bridge 105 are coupled to primary PCI bus 104 and secondary PCI bus 106 respectively. The primary and secondary interfaces of bridge 107 are coupled to primary PCI bus 106 and secondary PCI bus 108, respectively. Therefore, a total of four PCI interfaces exist within PCI to PCI bridges 105 and 107.

Bridges 105 and 107 allow transactions to occur between a master on one PCI bus and a target on another PCI bus. The master of a transaction that crosses a PCI to PCI bridge is said to reside on the initiating bus. The target of a transaction that crosses a PCI to PCI bridge is said to reside on the target bus. In bus architecture schemes such as PCI, multiple agents coupled to the bus must compete for ownership of the bus because only one agent can initiate a transaction at one time on the bus. The mechanism used to allow each of several agents coupled to a bus some amount of access time to that bus in a fair and rational manner is called arbitration.

For a transaction in which a bus agent coupled to PCI bus 108 is the master, while a bus agent coupled to PCI bus 104 is the target, it can take a significant amount of time for a transaction to be communicated between the master and target in the hierarchical computer system shown in FIG. 1. Through arbitration, the bus master must win ownership of PCI bus 108, PCI bus 106, and target PCI bus 104 before the transaction can be fully executed. Due to arbitration latency, bus acquisition latency, and target latency, the lower a device is in the bus hierarchy of a computer system, the more time it takes for that device to communicate with other devices closer to the processor, such as bus agents residing upstream of multiple bridges, main memory, or even the processor itself.

As a result, the PCI bus residing closest to the processor, which is coupled to the host bridge, usually supports higher performance bus agents than do PCI buses further down in the hierarchy. For example, in the computer system of FIG. 1, bus agents coupled to PCI bus 104 may include graphics devices and other data-intensive agents which require close proximity to main memory 103 and processor 101 for quick access to these units. In contrast, bus agents coupled to PCI bus 108 may include, for example, hard drives and other slower, low-performance devices.

Therefore, the hierarchical structure of the typical computer system of FIG. 1, which is implemented to overcome the loading limitations of PCI buses, limits the number of high-performance devices which can be incorporated into the system. In addition, the multiplicity of bridges necessary to create the hierarchical structure adds to the cost and increases the power consumption of the overall system. Also, for mobile computer systems, the additional space occupied by the multiple bridges increases the size of these systems.

SUMMARY OF THE INVENTION

It is one object of the invention to provide a computer system that can accommodate more high-performance peripheral devices in a minimum of space.

A bridge coupling a primary bus to two secondary buses is described. The bridge contains three interfaces, one for the primary bus and the other two for the two secondary buses. Control circuitry is included within the bridge to support the execution of a transaction initiated by a bus master upstream of the bridge to a target downstream of the bridge. The bridge also supports the execution of a transaction initiated by a bus master coupled to either one of the secondary buses to a target upstream of the bridge.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A bridge coupling a primary bus to two secondary buses is described wherein bus mastering by a bus agent coupled to the primary bus or either of the two secondary buses is supported by the bridge. The bridge contains three ports, each of which comprises both master and slave interfaces which are coupled to their respective buses. Read pre-fetch and write posting buffers are also included in the bridge to improve system performance. The bridge controls the arbitration for each of the two secondary buses. In addition, interface configuration logic is incorporated into the bridge to configure the bridge in accordance with the type of secondary bus to which it is coupled.

A triple-port bridge coupled to a primary bus and to two secondary buses which allows transactions to occur between a master on one bus and a target on another bus will be described in more detail below along with its application in a computer system.

Figure 2:
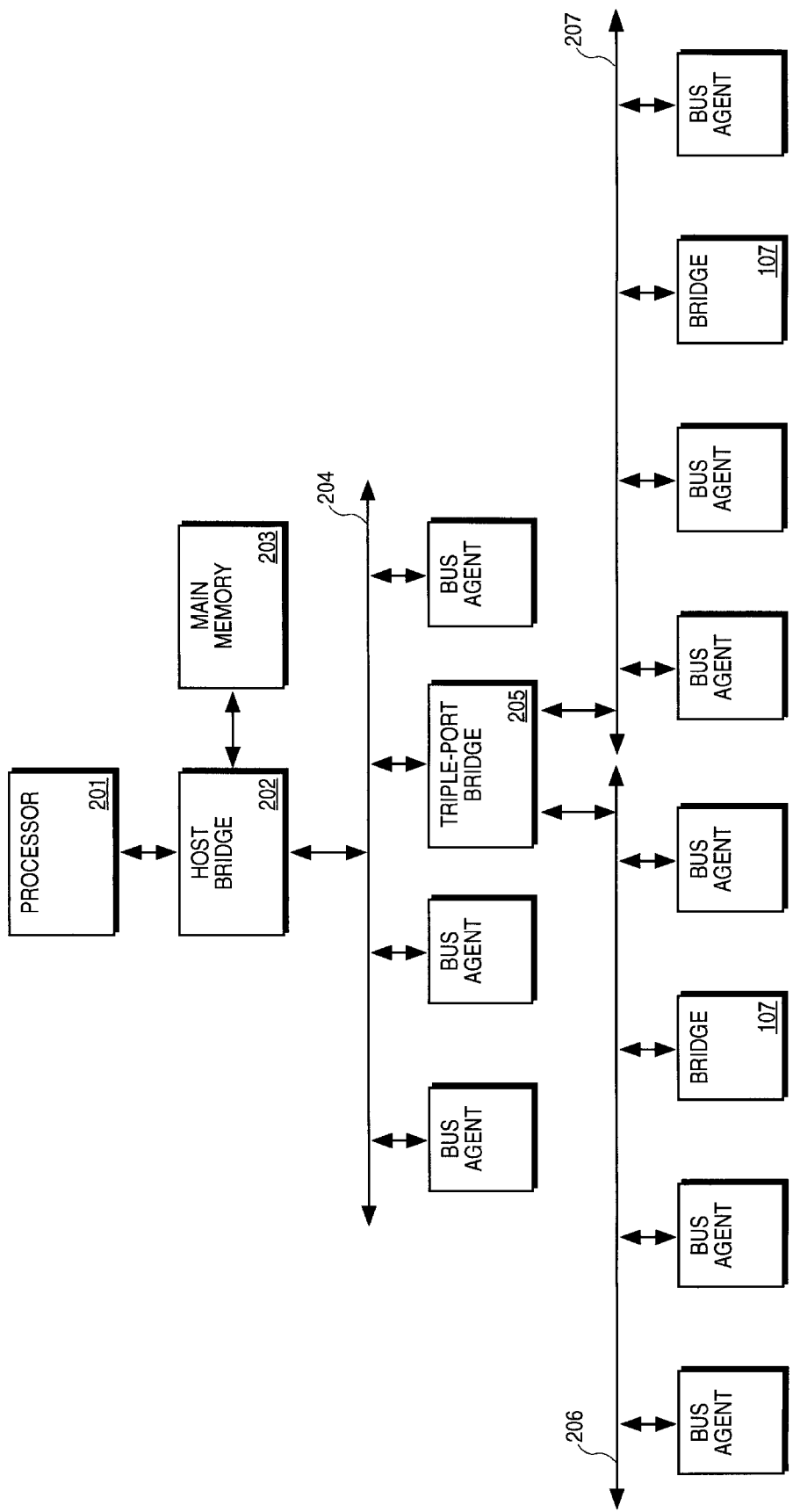
FIG. 2 is a block diagram of a computer system in accordance with an embodiment of the present invention.

FIG. 2 shows a block diagram of a computer system constructed in accordance with an embodiment of the present invention. Host bridge 202 is used to couple processor 201 to peripheral component interconnect (PCI) bus 204. Details regarding the operation of a PCI bus can be found in the PCI Local Bus Specification, Revision 2.1 (1995). In addition, host bridge 202 is used to couple the memory subsystem, main memory 203, of the computer system to processor 201 and PCI bus 204, and controls access thereto. Three bus agents are coupled to PCI bus 204 along with triple-port bridge 205. Triple-port bridge 205 is additionally coupled to a first secondary bus 206 and a second secondary bus 207. Additional bus agents are coupled to both bus 206 and bus 207.

For the embodiment of the present invention shown in FIG. 2, secondary buses 206 and 207 are both PCI buses. As such, triple-port bridge 205 functions as a three-port PCI to PCI bridge allowing transactions to occur between a master coupled to a bus at one port of the bridge, and a target coupled to another bus at another port of the bridge. As a PCI to PCI bridge, triple-port bridge 205 conforms to the PCI to PCI Bridge Architecture Specification, Revision 1.0 (1994). For an alternate embodiment of the present invention, the secondary buses coupled to triple-port bridge 205 are compliant with other bus architectures such as, for example, the Industry Standard Architecture (ISA) bus, or the Extended ISA (EISA) bus. In this embodiment, triple-port bridge 205 acts as a translator between differing bus architectures of the buses to which the bridge is coupled. For another embodiment, as described below, the secondary buses of the triple-port bridge are compliant with PCMCIA or CardBus standards. Also, for another embodiment, the buses coupled to the triple-port bridge are compliant with the PCI bus standard operating at different frequencies so that the triple-port bridge acts as a frequency translator between the buses coupled to its ports.

The bus agents coupled to primary PCI bus 204 and secondary PCI buses 206 and 207 alternatively function as masters, targets, or both, depending on the transaction being executed. For an alternate embodiment of the present invention, additional bridges, either conventional or triple-port bridges in accordance with one embodiment of the present invention, are coupled to the primary and/or secondary buses of the triple-port bridge to create a larger computer system. In addition, for another embodiment of the present invention, the primary port of the triple-port bridge need not be coupled to the PCI bus closest to the processor, rather, the triple-port bridge may be incorporated into a computer system lower in the hierarchy of buses. Alternatively, a triple-port bridge in accordance with an embodiment of the present invention is used to couple two primary buses to a single secondary bus.

Figure 1:
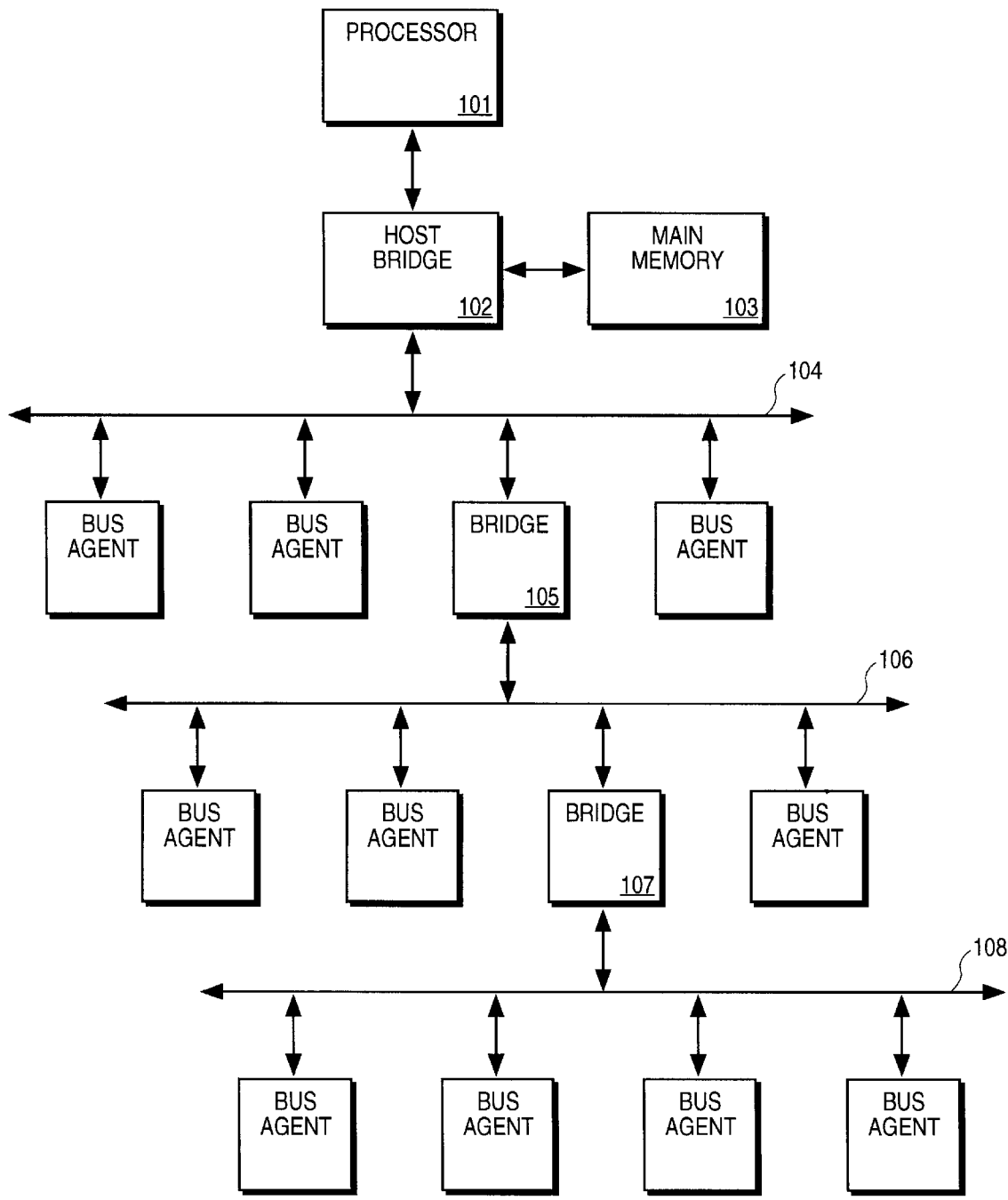
FIG. 1 is a block diagram of a computer system.

Note the advantages of the computer bus hierarchy of FIG. 2 over the computer bus hierarchy shown in FIG. 1. Using triple-port bridge 205 in the manner shown in FIG. 2, two secondary buses which might otherwise be arranged in a vertical fashion, such as PCI buses 106 and 108 of FIG. 1 are instead arranged as bus peers, occupying the same hierarchical level in the computer system. Because PCI buses 206 and 207 are arranged as peers of each other by triple-port bridge 205, the hierarchy of the computer system is effectively flattened, thereby eliminating a bus level between the bus agents coupled to secondary PCI buses 206 and 207, and primary PCI bus 204.

Because triple-port bridge 205 has served to eliminate a bus level in the hierarchy of the computer system, the amount of time it takes for a bus agent coupled to a secondary bus of triple-port bridge 205 to communicate and execute a transaction with a device upstream of the triple-port bridge is reduced. While bus levels in a computer system hierarchy may similarly be eliminated by coupling additional, conventional bridges to the primary bus of the system, these additional bridges contribute to the load on the primary bus and increase the cost of the overall system, as further described below. In accordance with one embodiment of the present invention, peripheral devices coupled to secondary PCI buses 206 and 207 can achieve higher performance than could be achieved by the devices coupled to, for example, PCI bus 108 of FIG. 1. Similarly, devices upstream of triple-port bridge 205 such as, for example, processor 201 or bus agents coupled to PCI bus 204, can access the devices downstream of triple-port bridge 205 such as, for example, the bus agents coupled to secondary PCI bus 206 or 207, in a shorter period of time.

In addition to the improved performance, triple-port bridge 205 serves the function of both bridge 105 and bridge 107 of FIG. 1. Combining two bridges into a single device in this manner has reduced the load on the PCI buses thereby allowing an additional bus agent to be coupled into the computer system. For example, note that the computer system of FIG. 2 supports 11 bus agents on its three PCI buses while the computer system of FIG. 1 only supports 10 bus agents on its three PCI buses. Furthermore, even though triple-port bridge 205 does the work of two independent conventional bridges, only three PCI interfaces need be incorporated into triple-port bridge 205, rather than the four PCI interfaces contained within the two conventional bridges which triple-port bridge 205 replaces. As a result, space, pin-count, power consumption, and system cost are all minimized through the use of triple-port bridge 205 over the use of the two separate, conventional bridges implemented in the computer system of FIG. 1.

In accordance with an embodiment of the present invention, triple-port bridge 205 supports the execution of a transaction initiated by a bus master upstream of a triple-port bridge to a target downstream of the bridge. For example, assume a transaction is initiated by processor 201 or by a bus agent coupled to PCI bus 204 in a bus mastering mode in which the target of the transaction is one of the bus agents coupled to secondary PCI bus 206 or 207. Triple-port bridge 205 forwards this transaction onto the appropriate secondary bus, 206 or 207, so that the target is reached. For another embodiment, triple-port bridge 205 additionally supports the execution of a transaction initiated by a bus master downstream of the triple-port bridge to a target upstream of the bridge.

For example, for an embodiment in which one of the bus agents coupled to PCI bus 206 acts as a bus master initiating a transaction to main memory 203, triple-port bridge 205 forwards the transaction up from PCI bus 206 through to PCI bus 204. Host bridge 202 then forwards this transaction on to main memory 203. In a similar manner, for an embodiment in which a bus agent coupled to PCI bus 207 functions as a bus master initiating a transaction to a target bus agent residing on primary PCI bus 204, triple-port bridge 205 forwards the transaction up from PCI bus 207 through to PCI bus 204.

In accordance with an embodiment of the present invention, triple-port bridge 205 additionally supports the execution of a transaction initiated by a bus master coupled to one secondary bus to a target coupled to the other secondary bus. For example, for an embodiment in which a bus agent coupled to secondary PCI bus 206 acts as a bus master initiating a transaction to a target bus agent coupled to the other secondary PCI bus 207, triple-port bridge 205 forwards the transaction from PCI bus 206 to PCI bus 207 for access by the target bus agent. For an embodiment of the present invention in which one or both of the secondary buses coupled to the triple-port bridge act as the primary bus for secondary buses branching off therefrom, the transaction forwarded across the triple-port bridge may originate at, or be destined for, a device coupled to one of these additional bus branches.

In accordance with an embodiment of the present invention, triple-port bridge 205 allows the initiating bus and target bus to communicate with each other while the third bus is permitted to operate independently. For example, for an embodiment in which primary PCI bus 204 is the initiating bus, and secondary PCI bus 207 is the target bus, triple-port bridge 205 will support the execution of the transaction by forwarding the transaction from bus 204 to 207 while secondary PCI bus 206 operates independently. Independent operation of secondary PCI bus 206 may include, for example, the execution of transactions between and among the bus agents coupled to PCI bus 206. Similarly, triple-port bridge 205 supports communication between secondary PCI bus 206 and 207, while primary PCI bus 204 is engaged in, for example, transactions between a bus agent coupled to PCI bus 204 and main memory 203. In contrast, the hierarchical structure of FIG. 1 requires that a bus agent coupled to bus 108 own buses 106 and 104 before communication with main memory 103 can occur. Thus, transactions between and among the bus agents coupled to buses 106 and 104 cannot be executed while a bus agent coupled to bus 108 is communicating with main memory.

Figure 3:
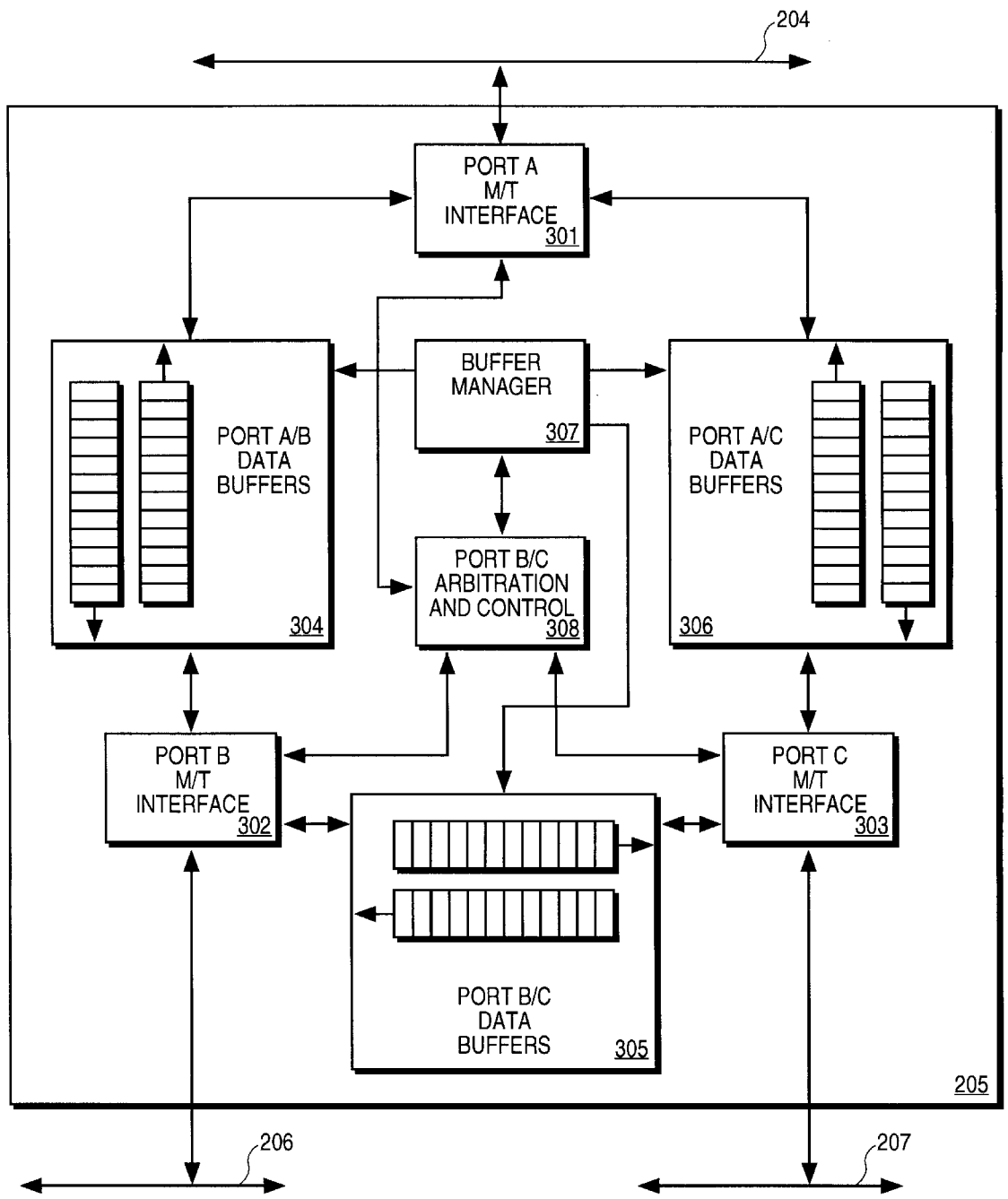
FIG. 3 is a diagram of a bridge formed in accordance with an embodiment of the present invention.

FIG. 3 shows an internal schematic of triple-port bridge 205 of FIG. 2. Triple-port bridge 205 includes three PCI ports, A, B, and C. As shown, port A, comprising master/target interface 301, is coupled to primary PCI bus 204. Port B, comprising master/target interface 302, is coupled to secondary PCI bus 206. Similarly, port C, comprising master/target interface 303, is coupled to the other secondary PCI bus 207. Port A 301 is coupled to port A/B data buffers 304 which is in turn coupled to port B 302. Port B 302 is coupled to port B/C data buffers 305 which is in turn coupled to port C 303. Port C 303 is coupled to port A/C data buffers 306 which is in turn coupled to port A 301. In addition, port A 301, port B 302, and port C 303 are each coupled to port B\C arbitration and control unit 308. Port A\B data buffers 304, port B\C data buffers 305, and port A\C data buffers 306 are each coupled to buffer manager 307. Buffer manager 307 is additionally coupled to port B\C arbitration and control unit 308.

Each of three PCI ports, A, B, and C, of triple-port bridge 205 comprise both master and target interfaces so that triple-port bridge 205 is capable of either master or target operation on any of the three buses to which it is coupled. Triple-port bridge 205 functions as a target on the initiating bus on behalf of the target that actually resides on the target bus. Similarly, the triple-port bridge functions as a master on the target bus on behalf of the master that actually resides on the initiating bus. For an alternate embodiment of the present invention, one or more of the three ports of triple-port bridge 205 includes only a master interface. This embodiment may be found useful for minimizing circuitry in applications in which the agents coupled to the bus at a particular port of the triple-port bridge all function exclusively as targets. For example, for an embodiment of the present invention in which one of the three ports of the triple-port bridge is coupled directly into a memory card socket, that port need only include a master interface because the memory card can only function as a target device.

Triple-port bridge 205 implements the use of data buffers 304, 305, and 306 to improve the efficiency of use of the buses to which the bridge is coupled. By implementing data buffering in this manner, the triple-port bridge effectively decouples the three buses from each other, letting each bus run at its maximum speed without being slowed by the operation of another bus. While implementation of data buffers 304, 305, and 306 in triple-port bridge 205 increases the performance of the bridge, however, these buffers also significantly increase the complexity of the bridge design. Therefore, for an alternate embodiment of the present invention, one, two, or all three of the data buffers are not included in the triple-port bridge.

Each of data buffers 304, 305, and 306 include both write posting and read pre-fetch buffers. Write posting buffers accept write data from one bus, and acknowledge to that bus that the data has been received. This frees that bus to perform other transactions. The bridge temporarily stores, or "posts", the write data until it can be written to the bus to which it is destined. Read pre-fetch buffers take the address from a single read transaction, and read additional data, speculating that it will eventually be needed. The bridge then holds that data in the read pre-fetch buffer until it is either used by a subsequent read transaction or is determined to be unusable. For one embodiment of the present invention, the triple-port bridge additionally includes configuration space registers which define the range of pre-fetchable addresses in memory. Using these registers, the triple-port bridge assures that only those areas of memory which are safe to pre-fetch are actually pre-fetched. Both write posting and read pre-fetch buffers dramatically increase performance of the computer system of FIG. 2 by not allowing a single, slow bus agent to slow down the entire system.

For example, for an embodiment in which a bus agent coupled to secondary PCI bridge 206 requests data from an address in main memory 203, the requested data along with data from nearby addresses is loaded into the read pre-fetch buffer within port A/B data buffers 304 through port A 301. Subsequently, the requested data is forwarded to secondary PCI bus 206 through port B 302 for access by the initiating bus agent. Next, when this initiating bus agent coupled to bus 206 requests data which has already been stored within the read pre-fetch buffer of port A/B data buffers 304, triple-port bridge 205 can simply forward the requested data from the buffer through port B 302, and onto initiating bus 206 for access by the requesting bus agent. In this manner, triple-port bridge 205 avoids disturbing primary PCI bus 204 with multiple transactions by the initiating bus agent.

As an example of the use of write posting buffers for one embodiment of the present invention, a bus agent coupled to secondary PCI bus 207 initiates a transaction in which data is to be written into main memory 203. The data to be written into main memory 203 is initially posted into the write posting buffer within port A\C data buffers 306 through the port C interface 303 coupled to PCI bus 207. Triple-port bridge 205 will then acknowledge that it has received the data, thereby freeing bus agents coupled to secondary PCI bus 207 to perform other transactions. Subsequently, once triple-port bridge 205 gains access to the system resources necessary to allow access to main memory 203, including, for example, primary PCI bus 204, the data posted within port A\C data buffers 306 is forwarded upstream through the port A interface 301. This data is then transferred to primary PCI bus 204, and ultimately on to main memory 203.

Choosing the proper sizes for data buffers 304, 305, and 306 involves important considerations and trade-offs. If the buffers are too small or too large they can defeat their purpose of improving system performance. Additionally, buffers take a large number of transistors to implement, so they should be kept as small as possible for cost and power savings. In accordance with an embodiment of the present invention, the read pre-fetch and write posting buffers support storage for up to four double-words. The operation of port A/B data buffers 304, port B/C data buffers 305, and port A/C data buffers 306 is under the control of buffer manager 307.

Triple-port bridge 205 provides arbitration for both secondary PCI buses 206 and 207. This arbitration is based on the principle that all accesses on primary PCI bus 204 have a higher priority than the secondary buses. Port B/C arbitration and control unit 308 arbitrates for ownership of both secondary PCI bus 206 and secondary PCI bus 207 in a fair manner. For an alternate embodiment of the present invention, priority, rotating priority, or other type of arbitration method is implemented by B/C arbitration and control unit 308.

For one embodiment of the present invention, when a bus agent on a bus coupled to the triple-port bridge functions as a bus master, initiating a write transaction to a target on a bus coupled to another port of the bridge, the triple-port bridge claims the cycle. The bridge then begins to accept the data into the appropriate write posting buffer between the interface coupled to the initiating bus and the interface coupled to the target bus. If the target bus is busy, the triple-port interface continues to accept the data until the associated write posting buffer is full. Once the triple-port bridge gains ownership of the target bus, the bridge delivers the data to the target bus which is in turn delivered to the target device. In accordance with an embodiment of the present invention, this is the method of operation for a write transaction regardless of which of the three buses coupled to the triple-port bridge are the initiating bus, and which of the remaining two buses coupled to the triple-port bridge are the target bus.

For one embodiment, when a bus agent on a bus coupled to the triple-port bridge acts as a bus master, initiating a read transaction to a target on a bus coupled to another port of the triple-port bridge, the bridge saves the address and command off the initiating bus, and indicates that the bus master should retry the bridge at a later time. When the target bus is available, the triple-port bridge begins a read transaction on the target bus. The bridge continues to indicate a retry to the bus master on the initiating bus until the bridge has obtained the requested data from the target. In addition to the requested data, the triple-port bridge stores additional data from nearby addresses into the appropriate read pre-fetch buffer between the initiating bus interface and the target bus interface within the bridge. Once this data has been loaded into the read pre-fetch buffer, the triple-port bridge then accepts the read transaction that matches the original address and presents the buffered data. If the bus master on the initiating bus requests the additional data stored within the bridge's read pre-fetch buffer, the bus master continues to read the additional data. Any unread data remaining within the read pre-fetch buffer is discarded. Note that this read transaction applies to triple-port bridge operation regardless of which of the three buses coupled to the triple-port bridge is the initiating bus, and which of the remaining two buses is the target bus.

For an alternate embodiment of the present invention, when a bus master on an initiating bus initiates a read transaction to a target on a target bus, the triple-port bridge does not save the address and command off the initiating bus. Instead, the triple-port bridge first determines if the target bus is busy. If the target is busy, the bridge indicates that the bus master should retry at a later time. If the target bus is not busy, the triple-port bridge forwards the request to the target bus to retrieve the data from the target, and forwards the data back to the initiating bus for the master.

Figure 4:
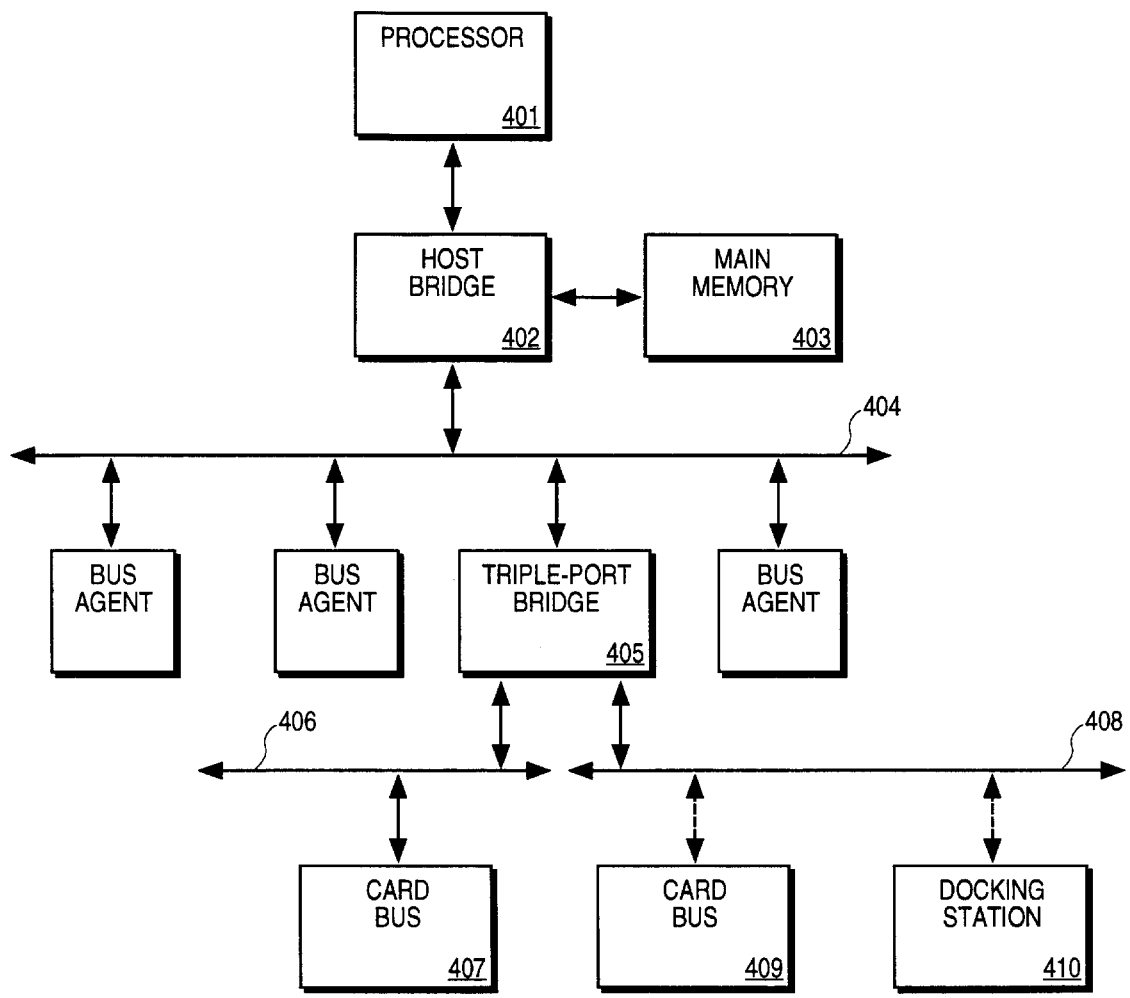
FIG. 4 is a block diagram of a mobile computer system in accordance with an embodiment of the present invention.

FIG. 4 shows a block diagram of a mobile computer system incorporating the use of triple-port bridge 405. Host bridge 402 is used to couple processor 401 to primary PCI bus 404. In addition, host bridge 402 couples primary PCI bus 404 and processor 401 to main memory 403, and controls access thereto. Bus agents are coupled to primary PCI bus 404 along with triple-port bridge 405. Secondary bus 406 is coupled to one of the secondary interfaces of triple-port bridge 405, while secondary bus 408 is coupled to the other secondary interface of the bridge. CardBus 407 is coupled to bus 406 while CardBus 409 and/or docking station 410 is coupled to bus 408.

In accordance with the embodiment of the present invention shown in FIG. 4, triple-port bridge 405 incorporates circuitry capable of translating between the language of primary PCI bus 404 and secondary buses 406 and 408. As shown, secondary bus 406 comprises a socket to which CardBus 407 is coupled. CardBus is an extension of the PCMCIA standard wherein CardBus comports with the PCI bus standard in a PCMCIA form factor. Similarly, secondary bus 408 comprises two sockets, allowing a user to determine if a CardBus 409 and/or a docking station 410 will be coupled to the bus.

The computer system of FIG. 4 is primarily useful for mobile computer systems including, for example, notebook and sub-notebook computers. In accordance with an embodiment of the present invention, triple-port bridge 405 is the same bridge shown and described in conjunction with FIGS. 2 and 3. Therefore, the secondary interfaces of triple-port bridge 405 additionally incorporate interface logic capable of discerning between a CardBus bus (which is a superset of a PCI bus), a PCI bus, and a docking station bus (which is also likely to be a superset of a PCI bus) coupled to its interface ports. After making this distinction, the triple-port bridge 405 performs the appropriate translations, allowing all three of the buses to which it is coupled to communicate between one another. For another embodiment of the present invention, the secondary interfaces of the triple-port bridge can additionally distinguish and communicate with older PCMCIA cards.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A bridge comprising:
   a first interface to couple to a primary bus, wherein the primary bus is a peripheral component interconnect (PCI) bus;
   a second interface to couple to a first secondary bus, wherein the first secondary bus is a CardBus socket;
   a third interface to couple to a second secondary bus, wherein the second secondary bus is a CardBus socket; and
   control circuitry coupled to the first, second, and third interfaces to control the execution of a first transaction initiated by a first bus master upstream of the bridge to a target downstream of the bridge, a second transaction initiated by a second bus master coupled to the first secondary bus to a target upstream of the bridge, and a third transaction initiated by a third bus master coupled to the second secondary bus to a target upstream of the bridge.

2. The bridge of claim 1, wherein the second secondary bus supports both a CardBus socket and a docking station interface or a user's selection between a CardBus socket and a docking station interface.

3. A bridge, comprising:
   a first interface to couple to a primary bus;
   a second interface to couple to a first secondary bus;
   a third interface to couple to a second secondary bus; and
   control circuitry coupled to the first, second, and third interfaces to control the execution of a first transaction initiated by a first bus master upstream of the bridge to a target downstream of the bridge, a second transaction initiated by a second bus master coupled to the first secondary bus to a target upstream of the bridge, and a third transaction initiated by a third bus master coupled to the second secondary bus to a target upstream of the bridge, wherein the bridge accepts data from the first bus master when the first bus master initiates a write transaction to a target device coupled to the first secondary bus while the first secondary bus is busy executing a transaction between a first bus agent and a second us agent, the first and second bus agents both coupled to the first secondary bus.

4. The bridge of claim 3, wherein the bridge subsequently transfers the data to the target device once the transaction between the first bus agent and the second bus agent has been completed.

5. A bridge comprising:
   a first interface to couple to a peripheral component interconnect (PCI) primary bus;
   a second interface to couple to a first secondary bus;
   a third interface to couple to a second secondary bus;
   an arbitration unit coupled to the second interface and to the third interface, the arbitration unit arbitrating for ownership of the first secondary bus and the second secondary bus; and
   control circuitry coupled to the first, second, and third interfaces to control the execution of a first transaction initiated by a first bus master upstream of the bridge to a target downstream of the bridge, a second transaction initiated by a second bus master coupled to the first secondary bus to a target upstream of the bridge, a third transaction initiated by a third bus master coupled to the second secondary bus to a target upstream of the bridge, and a fourth transaction initiated by a bus master coupled to the first secondary bus to a target coupled to the second secondary bus, wherein the first secondary bus is a CardBus socket, and the second secondary bus is a CardBus socket.

6. A bridge comprising:
   a first interface to couple to a peripheral component interconnect (PCI) primary bus;
   a second interface to couple to a first secondary bus;
   a third interface to couple to a second secondary bus;
   an arbitration unit coupled to the second interface and to the third interface, the arbitration unit arbitrating for ownership of the first secondary bus and the second secondary bus; and
   control circuitry coupled to the first, second, and third interfaces to control the execution of a first transaction initiated by a first bus master upstream of the bridge to a target downstream of the bridge, a second transaction initiated by a second bus master coupled to the first secondary bus to a target upstream of the bridge, a third transaction initiated by a third bus master coupled to the second secondary bus to a target upstream of the bridge, and a fourth transaction initiated by a bus master coupled to the first secondary bus to a target coupled to the second secondary bus, wherein the first secondary bus is a CardBus socket, and the second secondary bus supports both a CardBus socket and a docking station interface or a user's selection between a CardBus socket and a docking station interface.

7. A bridge comprising:
   a first interface to couple to a peripheral component interconnect (PCI) primary bus;
   a second interface to couple to a first secondary bus;
   a third interface to couple to a second secondary bus;
   an arbitration unit coupled to the second interface and to the third interface, the arbitration unit arbitrating for ownership of the first secondary bus and the second secondary bus; and
   control circuitry coupled to the first, second, and third interfaces to control the execution of a first transaction initiated by a first bus master upstream of the bridge to a target downstream of the bridge, a second transaction initiated by a second bus master coupled to the first secondary bus to a target upstream of the bridge, a third transaction initiated by a third bus master coupled to the second secondary bus to a target up stream of the bridge, and a fourth transaction initiated by a bus master coupled to the first secondary bus to a target coupled to the second secondary bus, wherein the bridge accepts data from the first bus master when the first bus master initiates a write transaction to a target device coupled to the first secondary bus while the first secondary bus is busy executing a transaction between a first bus agent and a second bus agent, the first and second bus agents both coupled to the first secondary bus.

8. A computer system, comprising:

a bridge comprising first, second, and third ports;

a peripheral component interconnect (PCI) primary bus coupled to the first port of the bridge such that transactions initiated by a bus master upstream of the bridge are forwarded to a target downstream of the bridge;

a first secondary bus coupled to the second port of the bridge such that transactions initiated by a bus master coupled to the first secondary bus are forwarded to a target upstream of the bridge; and a second secondary bus coupled to the third port of the bridge such that transactions initiated by a bus master coupled to the second secondary bus are forwarded to a target upstream of the bridge, wherein the computer system is a mobile system and the first and second secondary buses are CardBus sockets.

9. A computer system, comprising:

a bridge comprising first, second, and third ports;

a peripheral component interconnect (PCI) primary bus coupled to the first port of the bridge such that transactions initiated by a bus master upstream of the bridge are forwarded to a target downstream of the bridge;

a first secondary bus coupled to the second port of the bridge such that transactions initiated by a bus master coupled to the first secondary bus are forwarded to a target upstream of the bridge; and a second secondary bus coupled to the third port of the bridge such that transactions initiated by a bus master coupled to the second secondary bus are forwarded to a target upstream of the bridge, wherein the computer system is a mobile system and the first secondary bus is a CardBus socket while the second secondary bus supports both a CardBus socket and a docking station interface or a user's selection between a CardBus socket and a docking station interface.

10. The computer system of claim 9, wherein arbitration for the first secondary bus and the second secondary bus is performed by the bridge.

* * * * *